US011794872B2

(12) United States Patent
Ulliman et al.

(10) Patent No.: US 11,794,872 B2
(45) Date of Patent: Oct. 24, 2023

(54) ELECTRICAL POWER SYSTEM FOR A WATERCRAFT

(71) Applicant: American Superconductor Corporation, Ayer, MA (US)

(72) Inventors: John M. Ulliman, McLean, VA (US); Timothy MacDonald, North Grafton, MA (US); Stephen I. Callis, Brandywine, MD (US)

(73) Assignee: American Superconductor Corporation, Ayer, MA (US)

( * ) Notice: Subject to any disclaimer, the term of this patent is extended or adjusted under 35 U.S.C. 154(b) by 246 days.

(21) Appl. No.: 17/108,480

(22) Filed: Dec. 1, 2020

(65) Prior Publication Data
US 2022/0169354 A1 Jun. 2, 2022

(51) Int. Cl.
*B60L 50/13* (2019.01)
*H02J 3/00* (2006.01)
(Continued)

(52) U.S. Cl.
CPC .............. *B63H 21/17* (2013.01); *B60L 50/13* (2019.02); *H02J 3/0073* (2020.01); *H02J 3/38* (2013.01);
(Continued)

(58) Field of Classification Search
CPC ... B63H 21/17; B63H 2021/173; B60L 50/13; B60L 2200/32; B60L 2270/147;
(Continued)

(56) References Cited

U.S. PATENT DOCUMENTS 5,684,690 A * 11/1997 Levedahl ............... B63H 23/24
440/6
9,650,120 B2 5/2017 Hartig
(Continued)

FOREIGN PATENT DOCUMENTS

EP 1029783 A2 8/2000
EP 3648294 A1 5/2020

OTHER PUBLICATIONS

European Patent Office, International Search Report and Written Opinion, Application No. PCT/US2021/061342, dated Sep. 12, 2022, 13 pages.

*Primary Examiner* — Lincoln D Donovan
*Assistant Examiner* — Alex W Lam
(74) *Attorney, Agent, or Firm* — Sunstein LLP

(57) ABSTRACT

An electrical power system for a watercraft including a first electrical power plant configured to operate in a variable frequency mode to output variable frequency power to a first electrical network and a fixed frequency mode to output fixed frequency power to a second electrical network. There is a first electrical load including a first high temperature superconductor (HTS) motor connected to the first electrical network and a second electrical load connected to a second electrical network. A controller selectively connects the first electrical power plant to the first electrical network and operates the first electrical power plant in a variable frequency mode to output variable frequency power to power the first HTS motor and selectively connects the first electrical power plant to the second electrical network and operates the first electrical power plant in a fixed frequency mode to output fixed frequency power to power the second electrical load.

10 Claims, 10 Drawing Sheets

(51) Int. Cl.
  *H02J 3/38* (2006.01)
  *B63H 21/17* (2006.01)
  *H02K 55/04* (2006.01)
  *B63J 3/02* (2006.01)

(52) U.S. Cl.
  CPC .......... *H02K 55/04* (2013.01); *B60L 2200/32* (2013.01); *B60L 2270/147* (2013.01); *B63H 2021/173* (2013.01); *B63J 3/02* (2013.01); *H02J 2310/42* (2020.01)

(58) Field of Classification Search
  CPC ... B60L 1/00; H02J 3/0073; H02J 3/38; H02J 2310/42; H02K 55/04; B63J 3/02
  See application file for complete search history.

(56) References Cited

U.S. PATENT DOCUMENTS

| | | |
|---|---|---|
| 10,601,299 B2 | 3/2020 | Gamble |
| 10,669,001 B2 | 6/2020 | Ulliman et al. |
| 2012/0190554 A1* | 7/2012 | Hartig ........................ B63J 3/02 318/152 |
| 2012/0302112 A1 | 11/2012 | Hartig et al. |

* cited by examiner

ELECTRICAL POWER SYSTEM FOR A WATERCRAFT

FIELD OF THE INVENTION

This invention relates to an electric power system for a watercraft, such as a ship or submarine, and more specifically to a multi-function integrated power system which utilizes one or more HTS generators operating in both fixed and variable speed modes to energize the watercraft's electrical networks to power high temperature superconductor (HTS) motors for propulsion, electric weapon systems, and various onboard electrical loads (lighting and other hotel loads), without the need for a large power electronics drive system.

BACKGROUND OF THE INVENTION

The shipping industry and navies around the world are interested in upgrading their watercrafts (i.e. ships and/or submarines) using advanced technologies to provide, for example, improved fuel efficiency, greater electric capacity, and more sophisticated onboard systems. The terms watercraft, ship, and/or submarine may be used interchangeably throughout this document and each shall be interpreted to encompass any waterborne vessels, including, for example, boats, ships, hovercraft and submarines. Size and weight reductions in propulsion and power generation systems will provide additional room for more equipment, cargo, and/or crew, improved fuel economy, and enhanced survivability and flexibility. For naval ships and submarines, new varieties of electric weapons, advanced sensors, and integrated support systems may be of interest to navies around the world. Such systems may include electromagnetic guns and high-powered laser or microwave directed-energy weapons, which present especially rigorous electrical power demands. For example, they require large amounts of electrical power over very short time periods of time.

Typical propulsion and energy generation systems utilize single function marine gas turbine and diesel engine technologies to drive propeller shafts through a main reduction gear for mobility and separate dedicated electric power generated by prime movers are used to drive electrical generators to power electrical grids which feed the onboard electrical systems. There are physical limits in size and weight reductions that can be achieved with gas turbine technologies and significant advancements are not likely. In addition, marine gas turbine and diesel engine generator technologies, which are used to produce electrical power are typically designed to operate efficiently and reliably at constant loading. Therefore, they are unable to support the above described dynamic loads associated with advanced electrical systems, such as electric weapons, without significant and costly electrical system upgrades which may not even fit on the ship. For example, with a conventional gas turbine generator system an additional energy storage system, such as batteries or a fly wheel, may be needed to isolate the pulse effects of the primary energy storage powering the electric weapons.

The concept of an all-electric watercraft has been deployed in the form of a ship, which may include the use of electrical means for all power needs, including propulsion, in lieu of other means such as mechanical, pneumatic, and hydraulic, is gaining momentum. Such all-electric ships, having an integrated power system (IPS), in particular those utilizing high temperature superconductor motors and generators, will result in size and weight reductions, which will provide additional room and weight capacity for more equipment, cargo, weapons, and/or crew, as well as improved efficiency and fuel economy. These systems are envisioned to share electric power seamlessly across a common electric bus allowing for universally shared power for all electric functions of the watercraft from powering the propellers, to energizing the combat systems, to feeding the lighting and other hotel loads.

Such all-electric ships conventionally include one or more electric drive motors which are each for driving a propelling unit and are each fed by way of a respective electric power converter by an electrical power network on the ship (i.e. the ship's drive). The electrical power network is in turn fed by one or more diesel, gas or steam turbine generators. In this arrangement, the voltage of the electrical power network is of a fixed predetermined amplitude and frequency, for example having a medium voltage with a nominal voltage of 6.6 kV at a nominal frequency of 60 Hz. Where appropriate, a transformer is additionally connected between the converter and the power network. The converters convert the power network voltage (stepped down where necessary) to a voltage required to operate the electric motors driving the propellers, which electric motors have a different amplitude and frequency from the power network voltage.

The power converter system or drive is a very large, complex and expensive system. A known electric drive solution is described in U.S. Pat. No. 9,650,120 B2 (the '120 patent), which manages without using the ship's drive and instead it operates by coupling the generators and the electric propulsion motors to one another with no converters connected in between. The electric propulsion motors are driven by using one or more electric generators of variable speed and the electric motors are controlled and/or regulated indirectly, by control and/or regulation of the internal combustion engines for driving the generators. In this case the electric motors are connected to the generators in a fixed electrical coupling, that is to say that a change in rotational speed of the generators brings about a corresponding proportional frequency change which in turn changes the rotational speed of the electric propulsion motors. Thus, the function of a mechanical shaft is imitated using electrical machines. A drive solution of this kind is also called an "electric shaft".

The '120 patent utilizes the electrical energy from the electric shaft and converts the voltage having variable amplitude and frequency using a power converter and a power network synchronizing device to a voltage of constant amplitude and constant frequency for an onboard power network. While the power converter and power network synchronizing device described in the '120 patent are not as large and complex as the ship's drive described above with conventional the all-electric ships, it is still a large and complex system.

Therefore, there exists a need for a more compact and less complicated power system for providing power to all of the ship's electrical loads, including its electric propulsion motors, electrical weapons systems, and various onboard electrical equipment such as lighting and other hotel loads.

SUMMARY OF THE INVENTION

In one aspect, the disclosure features an electrical power system for a watercraft, including a first electrical power plant configured to operate in one of a variable frequency mode to output variable frequency power to a first electrical network and a fixed frequency mode to output fixed frequency power to a second electrical network. There is a first electrical load including a first high temperature superconductor (HTS) motor connected to the first electrical network to provide propulsion for the watercraft and a second electrical load connected to the second electrical network. There is a controller configured to selectively connect the first electrical power plant to the first electrical network and to operate the first electrical power plant in a variable frequency mode to output variable frequency power to power the first HTS motor and to selectively connect the first electrical power plant to the second electrical network and to operate the first electrical power plant in a fixed frequency mode to output fixed frequency power to power the second electrical load.

In other aspects of the disclosure, one or more of the following features may be included. The second electrical load includes at least one of an electric weapons system and a ship service system. There may further be included a third electrical network interconnected to a third load which includes at least one of an electric weapons system and a ship service system. The controller may be configured to selectively connect the first electrical power plant to one of the first electrical network, the second electrical network, and the third electrical network. The first electrical power plant may include at least one high inertia HTS generator. The first electrical power plant may include at least one gas turbine, steam turbine, or diesel engine prime mover interconnected to the at least one high inertia HTS generator. There may further be included a second electrical power plant configured to selectively power the first electrical network, the second electrical network, and the third electrical network. The second electrical power plant may include at least one high inertia HTS generator and at least one gas turbine, steam turbine, or diesel engine prime mover may be interconnected to the at least one high inertia HTS generator. The controller may connect the first electrical power plant to the first electrical network and operate the first electrical power plant in a variable frequency mode and the controller may connect the second electrical power plant to one or both of the second and third electrical networks and operates the second electrical power plant in a fixed frequency mode. There may further be included a fourth electrical load connected to the first electrical power network and the fourth electrical load may include a second high temperature superconductor (HTS) motor to provide propulsion for the watercraft. The watercraft may be one of a ship or a submarine.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1:
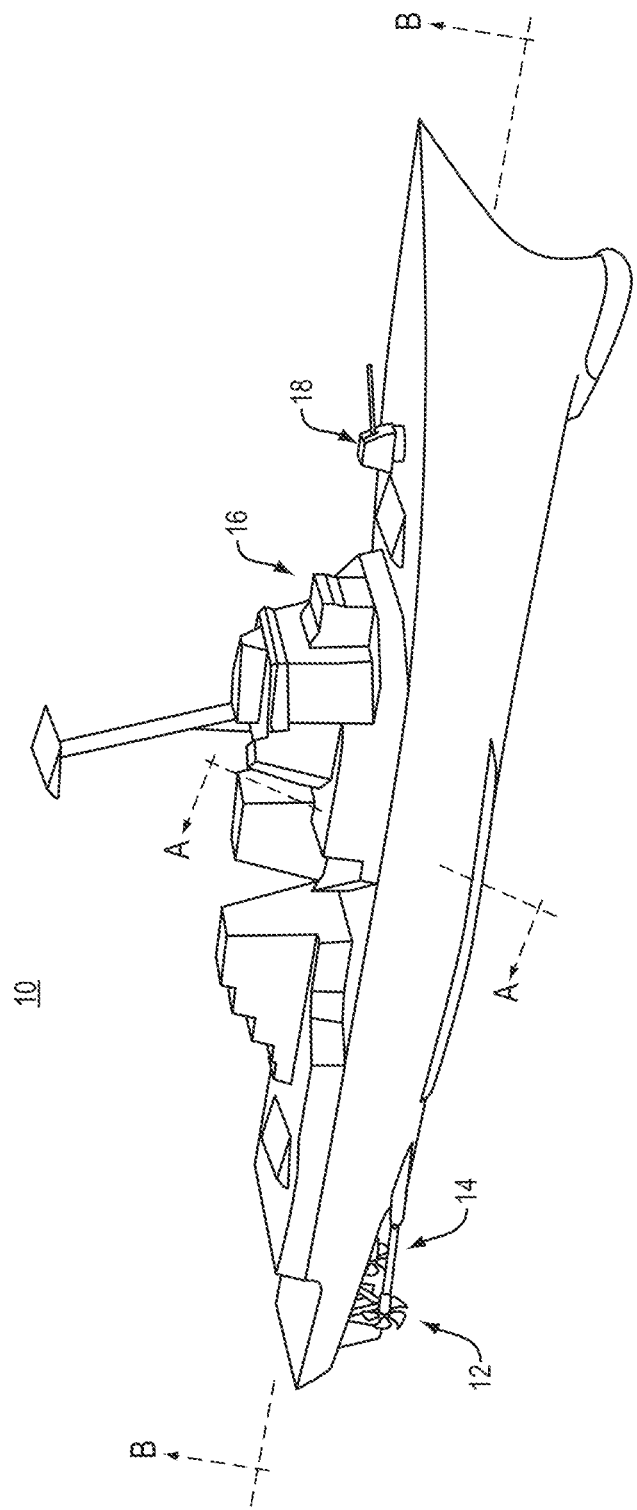
FIG. 1 shows a perspective view of a ship with a multi-function integrated power systems according to an aspect of this disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure.

The examples used herein are intended merely to facilitate an understanding of ways in which the system may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

While the preferred embodiment described herein as being incorporated into a ship, this is merely an exemplary application, as the multi-function integrated power systems according to this disclosure may be incorporated into any type of waterborne vessels, including, for example, boats, ships, hovercraft, submarines, or other type of watercraft, including unmanned water craft.

Referring to FIG. 1, there is shown ship 10, which may be a naval ship, e.g. a destroyer. While the inventive aspects of this disclosure are particularly applicable to naval ships, the disclosure is not limited to naval ships and could be applied to other types of ships with significant/rigorous noise and power requirements and need for size and weight reductions, such as oceanographic research ships and cruise ships. Ship 10 may include a first all-electric drive 12 and a second all-electric drive 14, which together form part of an all-electric propulsion and energy system. Alternatively ship 10 could be outfitted with a hybrid electrical and mechanical propulsion and energy system, as described and claimed in U.S. Pat. No. 10,669,001. Moreover, the disclosure is not limited to a ship with two drives and could be applied to a greater number of drives, provided there is at least one all electric propulsion system.

The propulsion and energy system according to this disclosure may be installed in a newly built ship according to a new ship design or it may be installed as a retrofit to an older/existing ship/design. The retrofit may be of an already built ship wherein a mechanical drive is replaced with an all-electric drive or it may be a retrofit of an existing ship design wherein the ship will be newly built with an all-electrical (or hybrid) propulsion and energy system.

Ship 10 may also include certain electric weapons 16 and 18, which may be, for example, electromagnetic guns and high-powered laser or microwave directed-energy weapons that require large amounts of power over very short time periods of time. Typical ships outfitted with existing, marine gas/steam turbine and diesel engine generator technologies, may not be able to support such advanced electrical weapons, since marine gas turbine, steam turbine, and diesel engine generators were originally designed to operate efficiently and reliably at constant loading. While an all-electric ship will support electric weapons systems, the power quality requirements for the onboard ship systems are stringent (so-called Type 1 power) and require expensive additional power quality components not fully developed yet, such as series inductance or other energy storage means. This results in many more large system components which are difficult and maybe impossible to find space for in the ship and are high in cost.

One of the advantages to the electric power system described herein is that it is capable of powering advanced electric weapon systems and other electric ship systems requiring Type 1 power (Mil Std. 1399), as well as providing ship propulsion with one common multi-function power source, at an affordable cost while reducing size, weight and technical complexity. In one aspect of the disclosure, ship power may be produced using one or more turbo-generators 50, FIG. 2, having gas turbine 52, which may drive a high inertia HTS generator 54 via shaft 56. In this example, high inertia HTS generator 54 may be a 29 MW 3600 rpm 2 pole generator. However, the disclosure is not limited to any particular prime mover generator or gas-turbine power level, pole count or configuration and is applicable to various gas turbine systems. Moreover, this disclosure is not limited to gas turbine systems, as steam turbines could be used as the prime mover in place of gas turbines.

In one aspect of the disclosure, the turbo-generators 50 may be configured to operate in dual modes, i.e. in a fixed frequency (e.g. 60 Hz)/fixed voltage (e.g. 4160 VAC) mode and a variable frequency/variable voltage mode. The turbo-generators 50 may comprise gas turbine 52 and high inertia HTS generator 54. Alternatively the high inertia HTS generator may be replaced with a more typical HTS generator, designed to minimize size and weight and having a lower rotational inertia. In a fixed frequency mode the power output of the one or more turbo-generators may be used for electric weapons systems and hotel loads. The operation of the multi-function turbo-generators in this mode is described below with regard to FIG. 3. In a variable frequency mode of operation, the one or more turbo-generators may be directly connected to one or more electric motors in a dedicated manner (i.e. they are not also connected to other electric loads). With the variable frequency mode, the generator kinetics are coupled directly to the electric motor kinetics without the large power electronic electric motor drive typically required for an electric ship propulsion motor. In other words, the rotational speed of the turbo-generator directly affects the rotational speed of the electric motor/propeller and hence the speed of the ship. This may be referred to herein as a synchronous propulsion drive.

The dual modes operation of the turbo-generators 50 may be engaged under the control of a master controller typically operated from the ship's bridge. In addition, and as will be described further below, the disclosure may utilize separate grids to power the ship's electric propulsion, electric ship systems (hotel loads), and electric weapon systems. The grids may be used in a dedicated fashion or they may be interconnected also under the control of the master controller. Various functional configurations may be implemented that allow one or more of the turbo-generators to be operated in fixed or variable frequency mode, as desired, and to connect the one or more turbo-generators to the various loads in a dedicated or a combined way.

Figure 3:
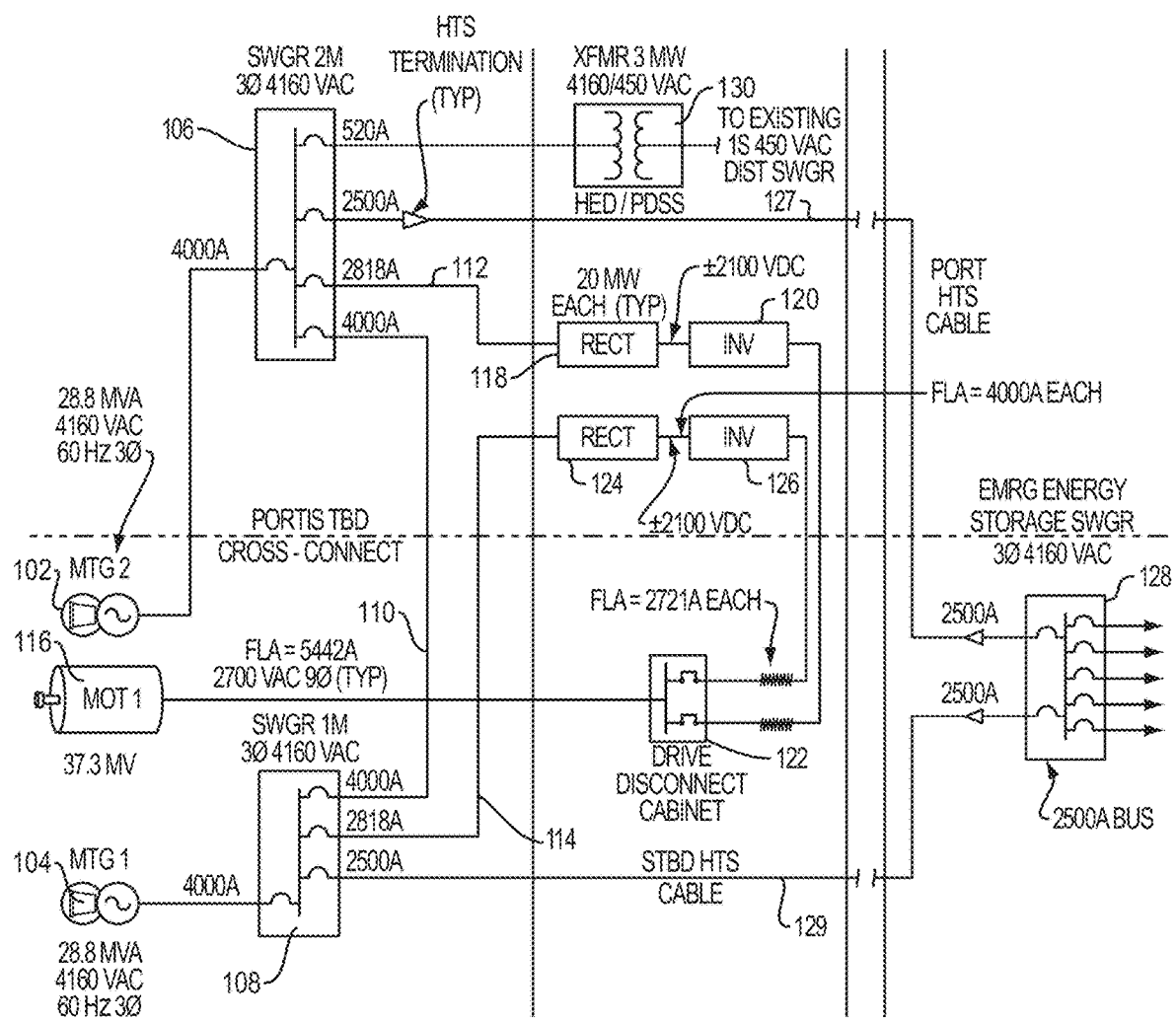
FIG. 3 shows a schematic block diagram of a prior art integrated power system utilizing a large motor drive system to drive the HTS ship propulsion motor.

Before describing the integrated power system topology utilizing a dual mode of turbo-generator operation, a prior art all-electric ship configuration utilizing HTS generators and motors and capable of operating ships electric propulsion, electric ship systems, and electric weapon systems is shown in FIG. 3. However, with this prior art topology, a large and complex power electronic drive system is required and is depicted in ship power grid configuration 100 of FIG. 3.

In FIG. 3, only one electric motor (starboard side) and two turbo generators are depicted for ease of description; however, one skilled in the art will understand that the port side of the ship would include an additional electric motor and two additional turbo generators, as well as associated electric components and electric drive. Ship power grid configuration 100 includes two turbo generators 102 and 104, which may be of the type shown in FIG. 2. Each generator in this example may output 29 MW of three phase power at 4160 V AC at 60 Hz. In this example, turbo-generator 102 is connected to the power grid through three phase switchgear 106 while turbo-generator 104 is connected to the power grid through three phase switchgear 108.

Switchgear 106 is connected to switchgear 108 by port/starboard cable 110 so that in the event of a failure of one of the turbo-generators its respective switchgear can be back fed and powered by the operational turbo-generator. Cables 112 and 114 from switchgear 106 and 108, respectively, supply power to electric propulsion motor 116, which may be a conventional electric motor or a HTS motor. In this example, the variable speed electric motor 116 is a HTS motor and the input voltage is nine phase AC at 2700 V (approximately 37 MW); therefore, the power from switchgear 106 and 108 must be converted and conditioned by a suitable power converter system.

The output from switchgear 106 may be connected to a motor drive comprising a rectifier 118 and inverter 120. Power from switchgear 106 may be converted to DC power by rectifier 118 and then the DC may be converted to nine phase AC by inverter 120. Rectifier 118 and inverter 120 form a motor drive for controlling the current input to/rotational speed of motor 116 when they are connected to the motor 116 by disconnect cabinet 122. The maximum output power of motor drive in this example is 20 MW. The output from switchgear 108 may be converted to DC by rectifier 124 and then the DC may be converted to nine phase AC by inverter 126. Rectifier 124 and inverter 126 form a motor drive for controlling the current input to/rotational speed of motor 116 when they are connected to the motor 116 by disconnect cabinet 122. The maximum output power of motor drive in this example is also 20 MW. When full power (40 MW) is needed for electric motor 116, both motor drives are connected via disconnect cabinet 122 to motor 116.

Continuing to refer to FIG. 3, ship power grid configuration 100 is also configured to supply power to pulsed power loads (not shown) through energy storage switchgear 128 powered by cables 127 and 129 connected to switchgear 106 and 108, respectively. In addition, transformer 130 connected to switchgear 106 converts 4160 V AC to 450 V AC and feeds that to distribution switchgear (not shown) to deliver lower voltage power to various systems on the ship. Thus, all loads (propulsion, electric weapons, and hotel loads) may be interconnected and powered by a common electric grid energized by one or more turbo-generators.

Figure 4:
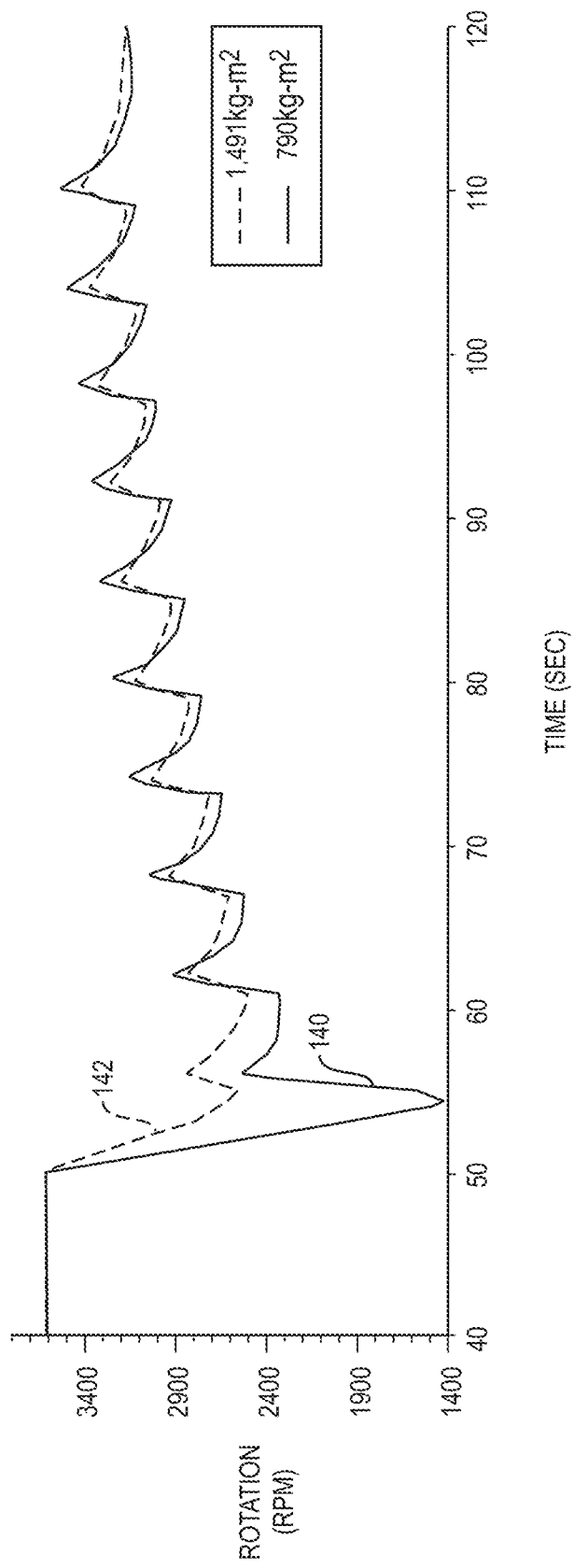
FIG. 4 shows a plot of turbo-generator rotational speed over time to depict the impact of pulsed power loads on generator rotational speed and hence power output.

Pulsed power loads may consist of several seconds (e.g. 5 seconds) of very high power draw (e.g. 10 MW or greater) through the energy storage switchgear 128 followed by a pause (e.g. 1 second) with no energy draw. The system design assumes that this cycle will be repeated indefinitely. As noted above, such pulsed loads can severely impact the proper operation of grid 100. A drop in rotational speed results in a proportionate drop in frequency, voltage and power from the turbo-generator. In FIG. 4, the impact on the rotational speed of such a pulsed load on turbo-generator 102/104 with a HTS generator is depicted over multiple pulse periods (assuming only one of the turbo-generators is operational).

As shown by waveform 140, turbo-generator rpm dips from 3600 to approximately 1400 over the course of a few seconds with the initial pulsed load of 18 MW. The rotational speed of the turbo-generator recovers somewhat over time as the cyclic 18 MW pulses continue, but it still remains substantially below its initial 3600 rpm rotational speed. In this cases, the estimated rotational inertia of the generator is approximately 790 kg-m2, which is based on the use of a HTS generator optimized for cost for a 29 MVA turbo-generator. In this example, the EM shield may be formed of steel and copper with an approximate thickness of 10 cm (4 in). In a weight optimized design, which may use aluminum in the EM shield, the rotational inertia may be significantly lower than in the cost optimized design. This means that the negative impact of the pulsed loads would be even greater.

With relatively low inertia in the turbo-generator, the torque imposed during the pulsed load on the turbo-generator has a more significant impact in reducing the rotational speed. In the example of waveform 140, this translates into a nearly 60% drop in rotational speed and a commensurate drop in voltage, frequency, and power on power grid 100. Moreover, with this level of cyclic loading on the turbo-generator it is certain to shorten turbine life and it may even cause the engine to shut down.

According to one aspect of this disclosure, it was realized that with greater rotational inertia in the HTS generator, the impact of the torque on the turbo-generator may be reduced and thus pulsed power loads, like electric weapons systems, powered by a common grid powering type I loads and electric ship propulsion motors without requiring expensive additional power quality/storage components, such as series inductance or other energy storage means.

Waveform 142 shows the impact on the rotational speed (approximately a 30% initial drop) of the turbo-generator, with a cyclic pulsed load of 18 MW. In this case, the HTS generator used has an increased rotational inertia resulting in an overall turbo-generator rotational inertia of approximately 1496 kg-m$^2$. The EM shield may be formed of steel with an approximate thickness of 18 cm (7 in). As is evident from waveform 142, as compared to waveform 140, increasing the rotational inertia of the turbo-generator to 1496 kg-m$^2$ reduces substantially the impact of the initial and the subsequent cyclic pulsed loads on the rotational speed of the turbo-generator as well as the impact on voltage, frequency, and power on power grid 100. Adding a tungsten alloy to the EM shield would further increase the rotational inertia to approximately 1817 kg-m$^2$.

Figure 5:
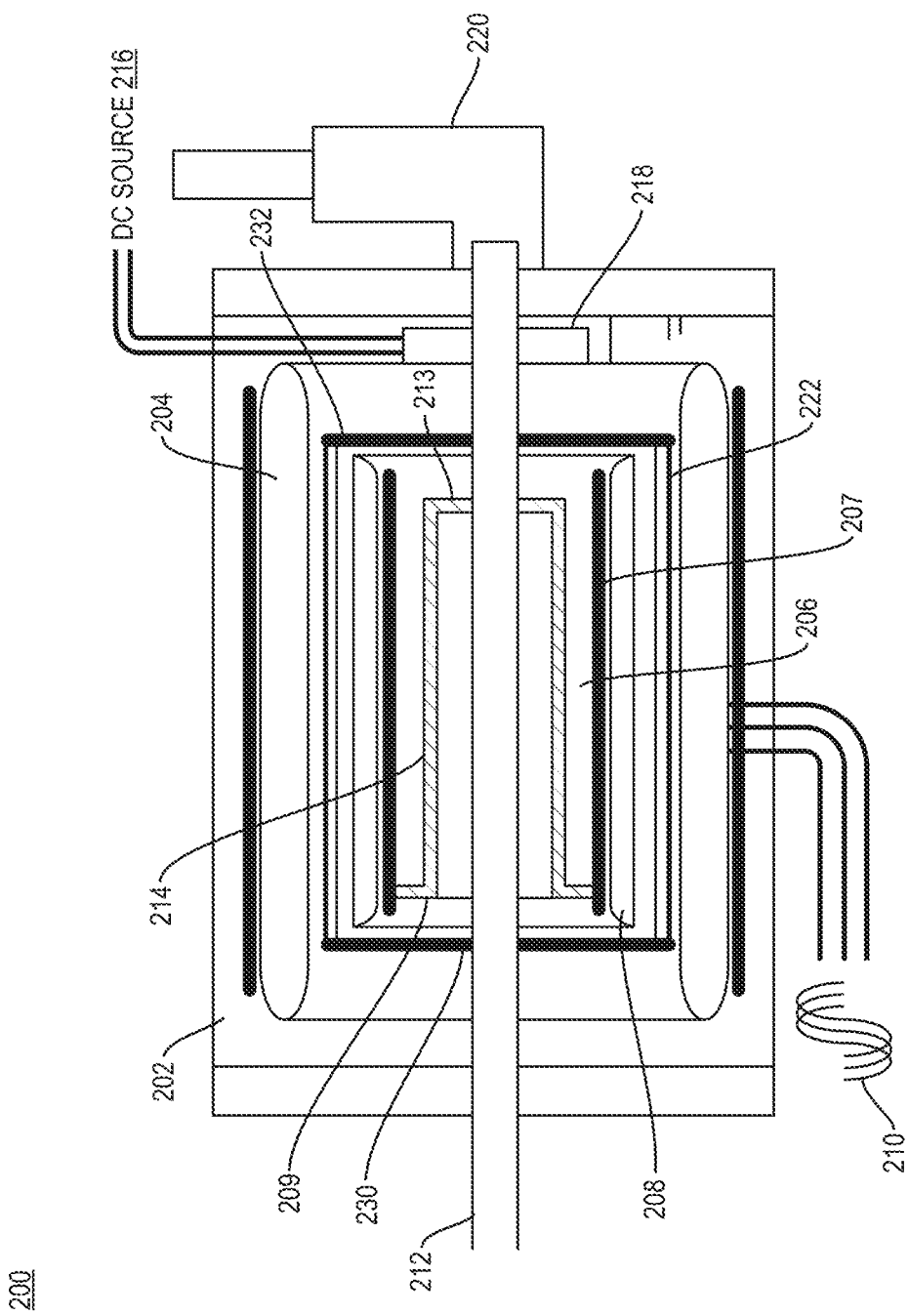
FIG. 5 shows a cross-sectional view of a HTS generator, taken along the length of the generator, designed to be optimized for size and weight reduction.

Referring to FIG. 5, there is shown a prior art HTS generator 200 which has been designed to be optimized for minimum size and weight. As with the lower rotational inertia generator that produced the waveform 140 in FIG. 4, this example may have a rotational inertia such that the overall rotational inertia of the turbo-generator will also be approximately 790 kg-m$^2$. HTS generator 200 includes a stator assembly 202 having stator coil assemblies 204 1-$n$. As is well known in the art, the specific number of stator coil assemblies 204 1-$n$ included within stator assembly 202 varies depending on various design criteria, such as whether the machine is a single phase or a poly-phase machine. For example, in one 29 MVA, 3-phase HTS generator described herein outputting 4500V AC at 60 Hz, stator assembly 202 may include seventy-two (72) stator coil assemblies 214 1-$n$.

A rotor assembly 206 rotates within stator assembly 202. As with stator assembly 202, rotor assembly 206 includes rotor winding assemblies 208 1-$n$. In the same 29 MVA, 3-phase HTS generator, rotor assembly 206 may include two rotor winding assemblies (forming 2 poles), which may be in a saddle coil configuration, as they are well suited to high rpm generator applications. These rotor winding assemblies, during operation, generate a magnetic flux that links rotor assembly 206 and stator assembly 202. While this generator is designed as a two-pole machine, it will be understood by those skilled in the art that various pole count machines could be used and the particular design will be dependent upon the application. During operation of generator 200, a three-phase voltage 210 is generated in stator coil assemblies 204 1-$n$ which, in turn, is output to the power grid of the ship as shown, for example, in FIG. 3. The three-phase voltage in the stator coil assemblies 204 1-$n$, is produced by the rotor winding magnetic flux generated by the rotor coil assemblies 208 1-$n$ that links rotor assembly 206 and stator assembly 202, as the rotor rotates when driven by turbo-generator shaft 212.

The rotor winding assemblies 208 1-$n$ may be mounted on an outside surface of support structure 207, which is connected to a first flange 209 that transfers the torque from torque tube 214. It should be noted that the rotor winding assemblies 208 1-$n$ may, alternatively, be mounted on an inside surface support structure 207. Torque tube 214 is connected to a second flange 213, which is connected to turbo-generator shaft 212. Flanges 209 and 213 may be incorporated into torque tube 214 or may be separate assemblies. Of course, other torque tube designs may be used to transfer the torque from the shaft 212 to the rotor assembly in the cold space.

During operation of superconducting rotating machine 200, field energy 216, for example, from a DC current source (not shown) may be applied to rotor winding assembly 208 1-$n$ through a slip ring/rotating disk assembly 218. Rotor winding assemblies 208$_{1-n}$, require DC current to generate the magnetic field (and the magnetic flux) required to link the rotor assembly 206 and stator assembly 202. Stator coil assemblies 204 1-$n$ are formed of non-superconducting copper coil assemblies, for example, while rotor winding assemblies 208 1-$n$ are superconducting assemblies incorporating HTS windings. Examples of HTS conductors include: thallium-barium-calcium-copper-oxide; bismuthstrontium-calcium-copper-oxide; mercury-barium-calcium-copper-oxide; and yttrium-barium-copper-oxide.

As these superconducting conductors only achieve their superconducting characteristics when operating at low temperatures, HTS generator 200 includes a refrigeration system 220. Refrigeration system 220 is typically in the form of a cryogenic cooler that maintains the operating temperature of rotor winding assemblies 208 1-$n$ at an operating temperature sufficiently low to enable the conductors to exhibit their superconducting characteristics. Since rotor winding assemblies 208 1-$n$ must be kept cool by refrigeration system 220, torque tube 214 may be constructed from a high strength, low thermal conductivity metallic material (such as Inconel™) or composite material (such as G-10 phenolic or woven-glass epoxy).

Rotor assembly 206 includes an electromagnetic shield 222 positioned between stator assembly 202 and rotor assembly 206 to shield or filter asynchronous fields from harmonics produced in the stator assembly 202. As rotor assembly 206 is typically cylindrical in shape, electromagnetic shield 222 is also typically cylindrical in shape. It is desirable to shield the rotor winding assemblies 208 1-$n$ of rotor assembly 206 from these asynchronous fields. Accordingly, electromagnetic shield 222, which is fitted to rotor assembly 206, covers (or shields) rotor winding assemblies 208 1-$n$ from the asynchronous fields and is constructed of a non-magnetic material (e.g., copper, aluminum, etc.). The electromagnetic shield 222 should be of a length sufficient to fully cover and shield rotor winding assemblies 208 1-$n$. Typically, the shield may be formed of aluminum with a thin overcoat of copper and having a thicknesses selected to shield ac fields and withstand fault loads. Aluminum is lightest solution but steel could be selected if weight is of less interest than cost. The shield also provides vacuum containment and steel presents a simpler sealing solution with welding.

The electromagnetic shield 222 may be rigidly connected to shaft 212 via a pair of end plates 230, 232. This rigid connection can be in the form of a weld or a mechanical fastener system (e.g., bolts, rivets, splines, keyways, etc.). For shielding, the thickness of electromagnetic shield 222 varies inversely with respect to the frequency of the three-phase AC power 210, which in this example is 60 Hertz. For low pole count designs the thickness may be selected to withstand transient forces during fault. For this frequency, typically, the thickness of electromagnetic shield 222 would be no more than 10 cm (4 in) of steel and copper. In order to reduce the size and weight of the generator, prior art systems such as this one, minimized the thickness of the electromagnetic shield 122 to the point where it was of a sufficient thickness to filter the asynchronous fields and to support fault ovalizing forces on the shield, but no thicker, so as to minimize generator weight and size.

Figure 6A:
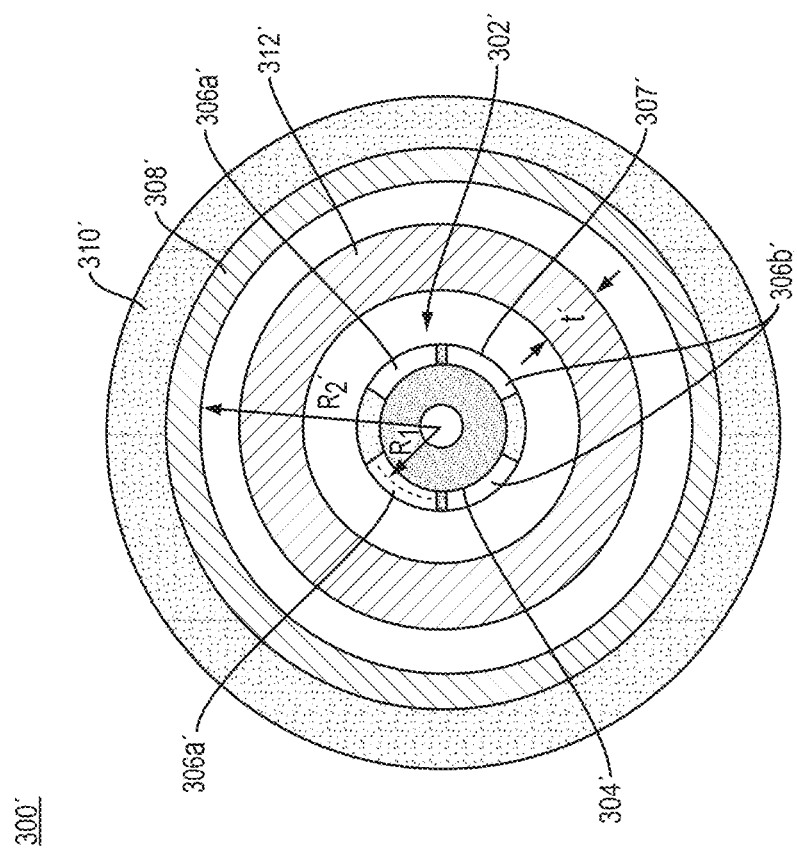
FIG. 6A shows a cross-sectional view of the type of HTS generator of FIG. 5, taken across the width of the generator, to depict the dimensions of the generator including electromagnetic shield thickness and the electromagnetic gap.

Although not shown in generator 200 of FIG. 5, an inner ferromagnetic core (e.g. an iron core) may be used to increase the magnetic permeance of the rotor and hence may allow for a reduced amount of HTS material needed to generate a given magnetic field. It also adds to the rotational inertia of the generator in a significant way. In FIG. 6A there is shown a schematic cross-sectional view of HTS generator 300, which is similar to the type of HTS generator shown in FIG. 5. The cross-sectional view is taken across the width of the generator, to depict the dimensions of the generator including electromagnetic shield thickness and the electromagnetic gap. In this example, HTS generator 300 includes a rotor assembly 302 having an inner iron core 304 depicted as a two pole generator. Rotor windings 306$a$ and 306$b$ are in the form of saddle coil windings and are each shown with two arc sections, which are joined at the ends to form the saddle coil.

In designing HTS generator 300, the limit on tip speed for HTS saddle coils 306$a/b$ must be considered. Centrifugal loading on the HTS coils results in strain in the superconductor material. This strain is proportional to the square of the tip speed of the coils. Experience and analysis indicates that 150 m/sec tip speed is an acceptable limit for such coils. Generators for naval use may require over-speed testing up to 125% of rated speed. For a design speed of 3600 rpm, this corresponds to an over-speed test at 4,500 rpm requiring a field winding with a ~0.32 m radius from the longitudinal axis of the generator to the mid-plane of coils 306$a/b$, which is depicted as R1 in FIG. 6A. The saddle coils are supported on their outside by a coil support cylinder 307.

The nonrotating part of generator 300 begins at radius R2, which extends from the generator longitudinal axis to the inside radius of the stator 308, and consists of stator 308 and back iron 310. Outside of the coil support cylinder 307 is the EM shield 312, which is the outermost rotating member of rotor assembly 302. As described above, it shields the rotor assembly 302 from electromagnetic fields that are asynchronous with respect to the rotation to reduce AC losses in the HTS coil. The field strength produced by saddle coils 306$a/b$ is proportional to the ampere-turns in each coil, but is inversely proportional to the electromagnetic ("EM") gap (R2−R1) between the saddle coils and stator. Thus, increasing the EM gap increases the number of ampere-turns and hence the amount of HTS wire needed to generate a given electromagnetic field.

The majority of the EM gap (R2−R1) consists of the EM shield 312 and in a weight or cost optimized design, the EM shield is only made thick enough to perform its shielding function and its weight/mass is minimized by selecting a low density material with shielding capabilities. The EM shield 312 thickness, t, is generally <40% of R1/$p$, where p is the number of pole pairs in the design (p=1 for a two pole generator). For this design the thickness, t, may be 10 cm (4 in) and the material used for the EM shield may be a moderate-density material such as steel.

To determine the rotational inertia for EM shield 312, the inner radius Ri and outer radius Ro and a mass M would be calculated as follows:

$$M(Ri^2+Ro^2)/2$$

which, in this case, is approximately 560 kg-m². The EM shield rotational inertia relative to the rotational inertia of the other system components in the turbo-generator would be as follows:

| Rotational Inertia—Cost Optimized Design | |
| --- | --- |
| EM Shield | 560 kg-m² |
| Inner Iron and Shafts | 143 kg-m² |
| Field and support | 87 kg-m² |
| Total Gen. Rotor | 790 kg-m² |
| Turbine | 96 kg-m² |
| Total | 886 kg-m² |

For this example, the rotational inertia of the EM shield relative to the rotational inertia of the total generator is approximately seventy percent (70%). For typical cost/weight optimized designs, the rotational inertia in the EM shield is generally ≤70% of the overall HTS generator rotational inertia (referred to herein as "low inertia" HTS generators).

Figure 6B:
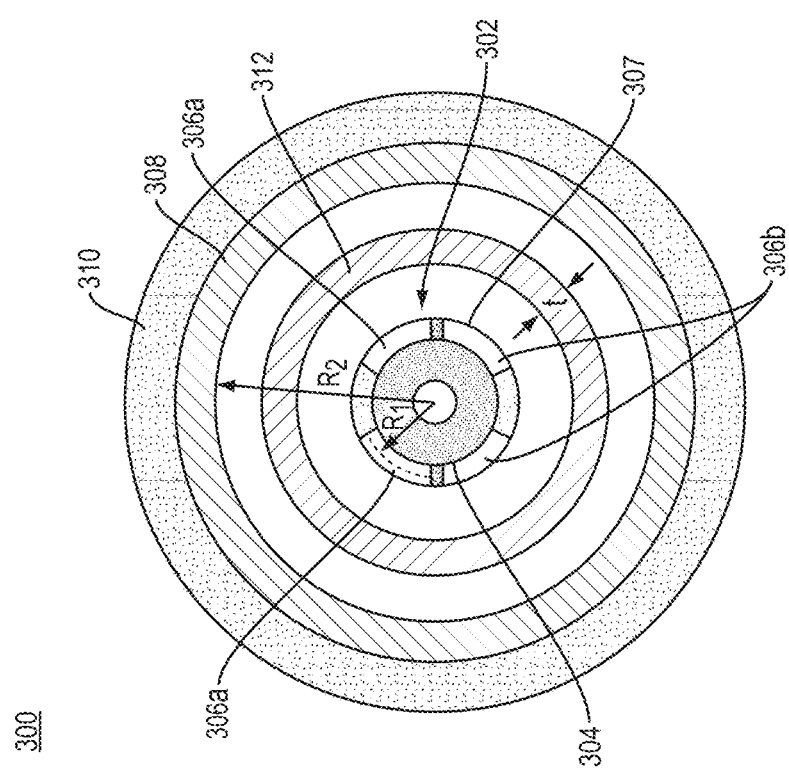
FIG. 6B shows a cross-sectional view of an HTS generator with increased rotational inertia according to an aspect of this disclosure, taken across the width of the generator, to depict the dimensions of the generator, including the electromagnetic shield thickness and the electromagnetic gap.

An HTS generator with increased rotational inertia is shown in FIG. 6B as HTS generator 300'. All components are essentially the same as HTS generator 300 of FIG. 6A, however, by constructing a thicker EM shield 312' the rotational inertia of the generator can be increased at the expense of additional ampere-turns in saddle coils 306a'/b'. In other words, a greater amount of HTS material will be required to produce the same electromagnetic field in HTS generator 300' as in HTS generator 300, since the EM gap (R2'-R1') of HTS generator 300' is greater than the EM gap (R2-R1), due to the increased thickness of the EM shield 312'.

For the increased rotational inertia design of HTS generator 300', the EM shield 312' thickness, t', may be ≥50% of R1/$p$. For this design, the thickness, t', may be approximately 18 cm (7 in). In addition to increasing the thickness of the EM shield to increase its rotational inertia, higher density materials could be used. Examples of such materials may include copper (8.96 g/cm3), steel (7.84 g/cm$^3$), lead (11.32 g/cm$^3$), gold (19.282 g/cm$^3$), tungsten (19.25 g/cm$^3$), and spent uranium (18.95 g/cm$^3$). One or more of these materials may be used to construct the EM shield.

By selecting the appropriate thickness and material composition of the EM shield 312', the amount of additional rotational inertia of the EM shield can be tailored to obtain desired operational characteristics for the particular turbo-generator and expected level and frequency of pulsed power loads.

To determine the rotational inertia for EM shield 312', the inner radius Ri' and outer radius Ro' and a mass M' (using a combination of steel and tungsten alloy, for example) would be calculated as follows:

$$M'(Ri'^2+Ro'^2)/2$$

which, in this case, is approximately 1,477 kg-m$^2$. The EM shield rotational inertia relative to the rotational inertia of the other system components in the turbo-generator would be as follows:

| Rotational Inertia—Rotational Inertia Optimized Design | |
| --- | --- |
| EM Shield | 1,477 kg-m$^2$ |
| Inner Iron and Shafts | 151 kg-m$^2$ |
| Field and support | 92 kg-m$^2$ |
| Total Gen. Rotor | 1,720 kg-m$^2$ |
| Turbine | 96 kg-m$^2$ |
| Total | 1,816 kg-m$^2$ |

For this rotational inertia optimized example, the rotational inertia of the EM shield relative to the rotational inertia of the total generator is approximately eighty-five percent (85%). For typical rotational inertia optimized designs, the rotational inertia in the EM shield may be generally ≥80% of the overall HTS generator rotational inertia (referred to herein as "high inertia" HTS generators).

If this design with a thick EM shield were constructed with just stainless steel in the EM shield the generator rotational inertia would still be 1492 kg-m$^2$ which is still nearly 190% of the rotational inertia of the cost and weight optimized design. The design of the HTS generator according to this disclosure has a number of important advantages; namely, it fits within a short axial length, has low reactance that avoids pole slipping in a highly pulsed application, and has high rotational inertia.

As noted above, an aspect of the disclosure utilizes HTS generators (preferably high inertia HTS generators) which may be configured to operate in two modes (i.e. fixed frequency mode and variable frequency mode) for the ships main turbine generators (MTG) turbo-generators. Each of the MTGs may be configured and operated in either mode and used to selectively power the ship's electric propulsion systems (variable frequency mode), electric ship systems (fixed frequency mode), and electric weapon systems (fixed frequency mode), creating a multi-functional integrated power system (MF-IPS) with significant flexibility powering the various ships systems.

Figure 7:
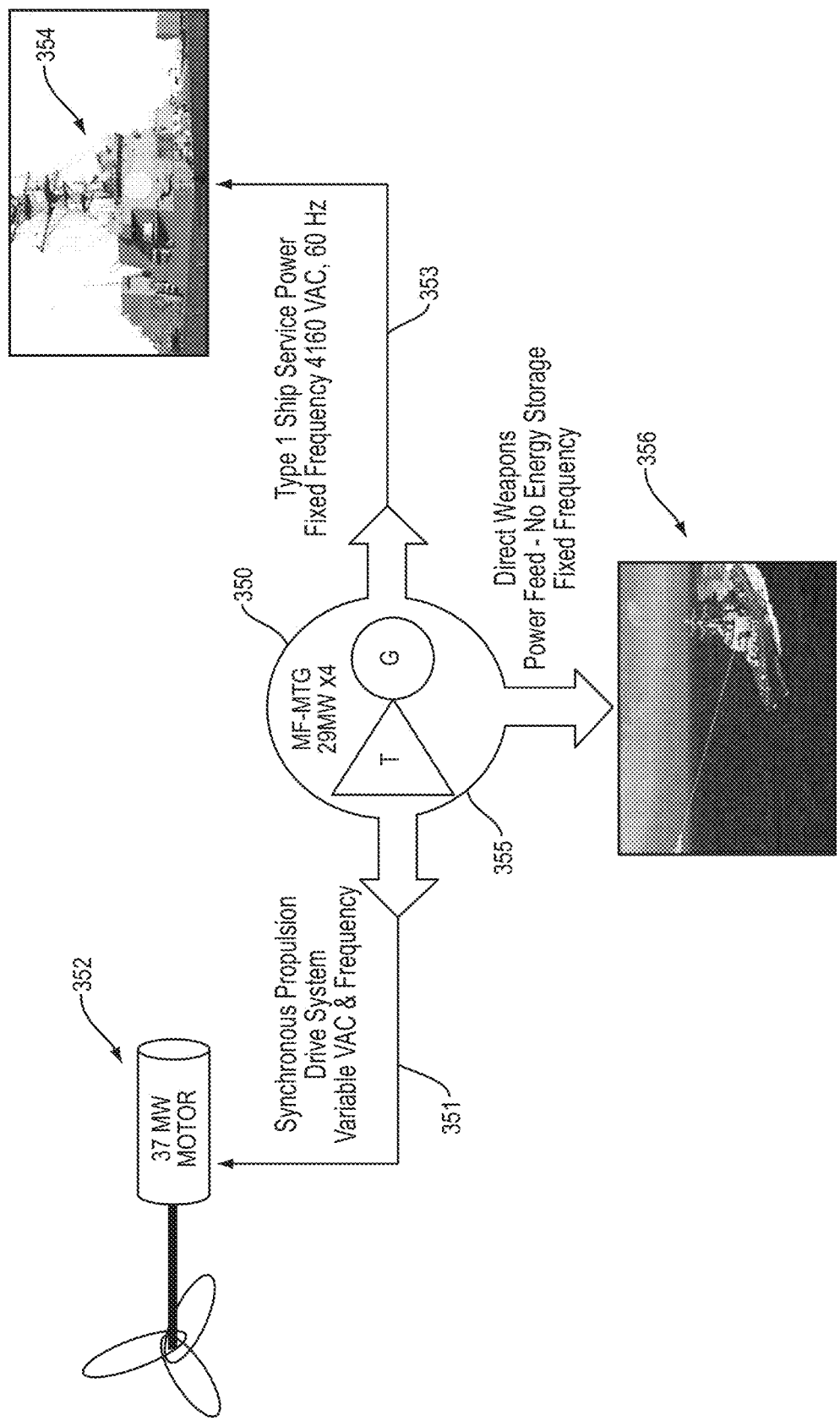
FIG. 7 shows a schematic diagram of the multi-function main turbine generator configured to feed three separate networks to provide power ship, electric weapons ship service systems.

A simplified schematic diagram of a multi-function main turbine generator (MF-MTG) 350 according to an aspect of this disclosure is depicted in FIG. 7. MF-MTG 350 may be used to selectively power shipboard electric grids connected to three primary ship systems. The ship systems include a synchronous propulsion drive system 352, which may include a 37 MW HTS electric motor, connected via electrical power network 351. MF-MTG 350, when connected to electrical power network 351 may be configured to operate in variable frequency power mode (variable frequency and variable voltage) to drive the HTS electric motor. Type 1 ship service power system, 354 may be connected to MF-MTG 350 by electrical power network 353. In this configuration, electrical power network 354 would be powered by MF-MTG 350 operating at a fixed frequency power mode (fixed voltage, e.g. fixed voltage 4160 VAC, and fixed frequency, e.g. 60 Hz). And, in another configuration, electric weapons systems 356, connected to electrical power network 355, may be powered by MF-MTG 350 operating at a fixed frequency (e.g. 60 Hz) and voltage. In this simple example, a single MF-MTG is used; however, in a typical application, multiple MF-MTG's operating in either mode depending on the system load may be used to power the various onboard systems. In the examples described below with regard to FIGS. 8A-8C, four MF-MTGs are used; however, any suitable number may be used.

Unlike prior art IPS systems, which incorporate all electric power on a single bus operating at a fixed voltage (e.g. 4160 VAC) and fixed frequency (e.g. 60 Hz) for the distribution to all demanded loads, the multi-functional integrated power system of the disclosure, uses multiple separate buses. The separate busses may be used in a dedicated or interconnected manner to power specific demanded load types. This minimizes the complication, risk and attendant significant volume of power electronics and computing power required to maintain stability and near type 1 quality power required for single bus operation. It eliminates the large and complex power electronics motor drive typically needed for electric propulsion motors and it utilizes high inertia HTS generators to directly connect to the electric weapons, rather than connecting through large and expensive intermediary energy storage devices and filter.

In a fixed frequency mode the power output of the turbo-generators may be used for electric weapons systems, and/or type 1 ship service loads. In a variable frequency mode of operation, the turbo-generators may be directly connected to one or more electric motors in a dedicated manner (i.e. they are not also connected to other electric loads). With the variable frequency mode, the generator kinetics are coupled directly to the electric motor kinetics without the large power electronic electric motor drive typically required for an electric ship propulsion motor. In other words, the rotational speed of the turbo-generator directly affects the rotational speed of the electric motor/propeller and hence the speed of the ship. This may be referred to herein as a synchronous propulsion drive.

Figure 8A:
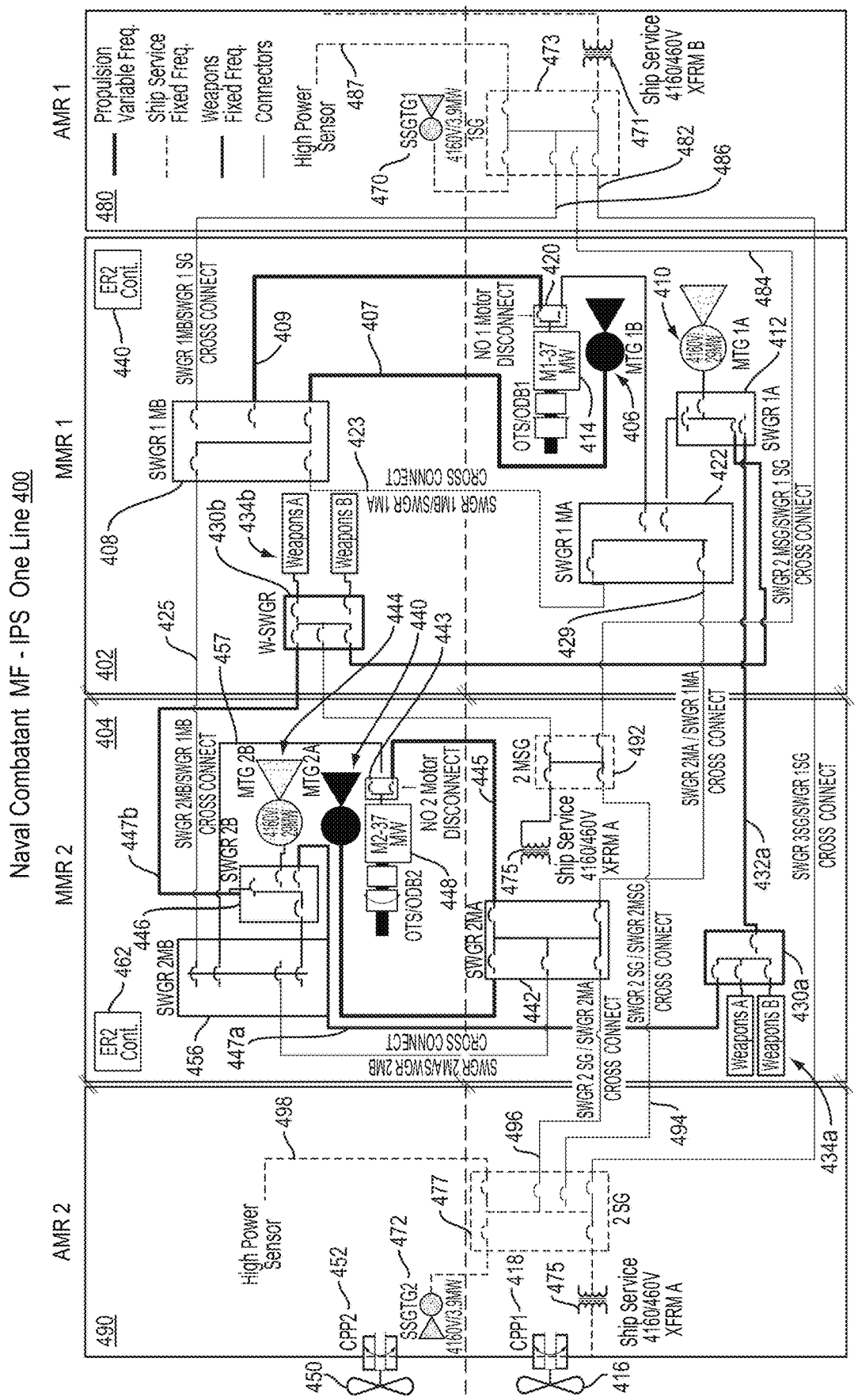
FIG. 8A shows a schematic diagram of a multi-function integrated power system according to an aspect of the disclosure, configured in one mode of operation.
Figure 8B:
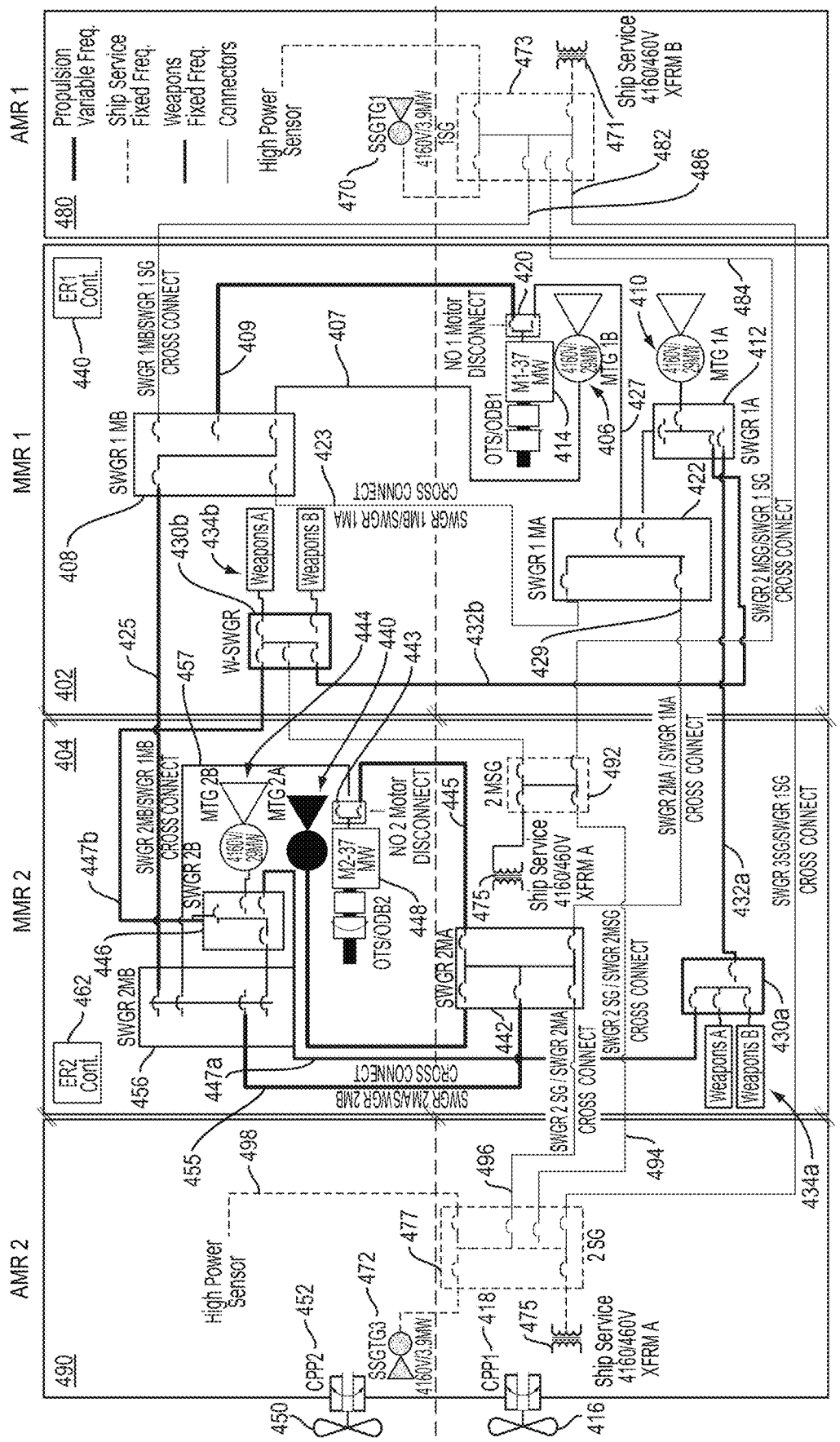
FIG. 8B shows a schematic diagram on the multi-function integrated power system according to FIG. 8A, configured in second mode of operation.
Figure 8C:
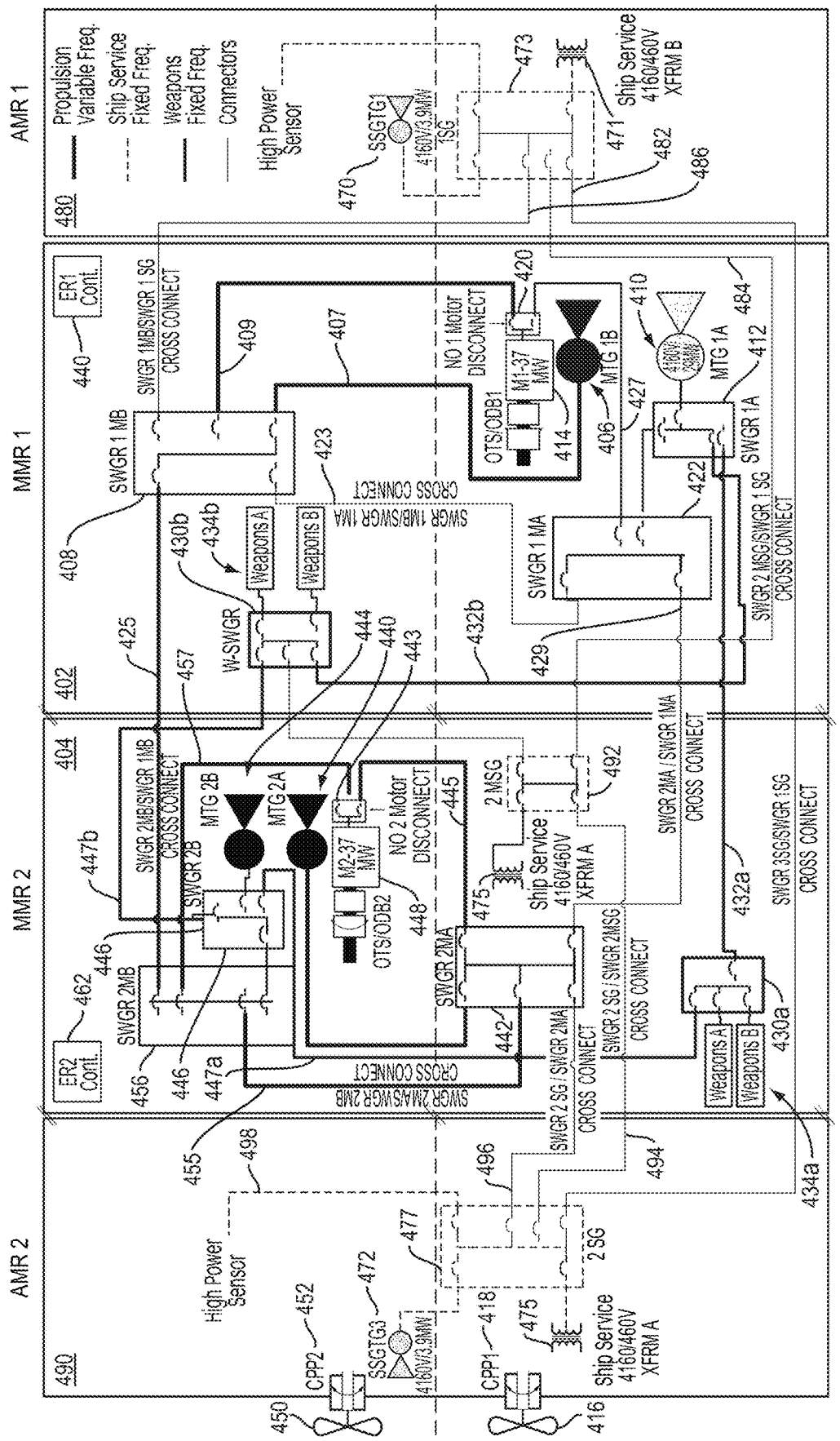
FIG. 8C shows a schematic diagram on the multi-function integrated power system according to FIG. 8A, configured in third mode of operation.

In FIG. 8A-C, the topology of multi-functional integrated power system 400, according to an aspect of this disclosure, is shown. Also in FIGS. 8A-8C, three functional configurations of the MF-IPS 400 are depicted only as exemplary configurations. It should be noted that other configurations are possible and are within the scope of the disclosure. As will be described, in certain configurations, the turbo-generators will be operated in a fixed frequency/fixed voltage mode and in others it will be operated in a variable frequency mode/variable voltage mode to power different ship systems. In the figures, cables that are depicted with thicker lines are energized with cables depicted as thinner lines are de-energized. The turbo-generators that are depicted with solid colors are online and operational while the turbo-generators which are not depicted with solid colors are off-line and not operational.

Figure 2:
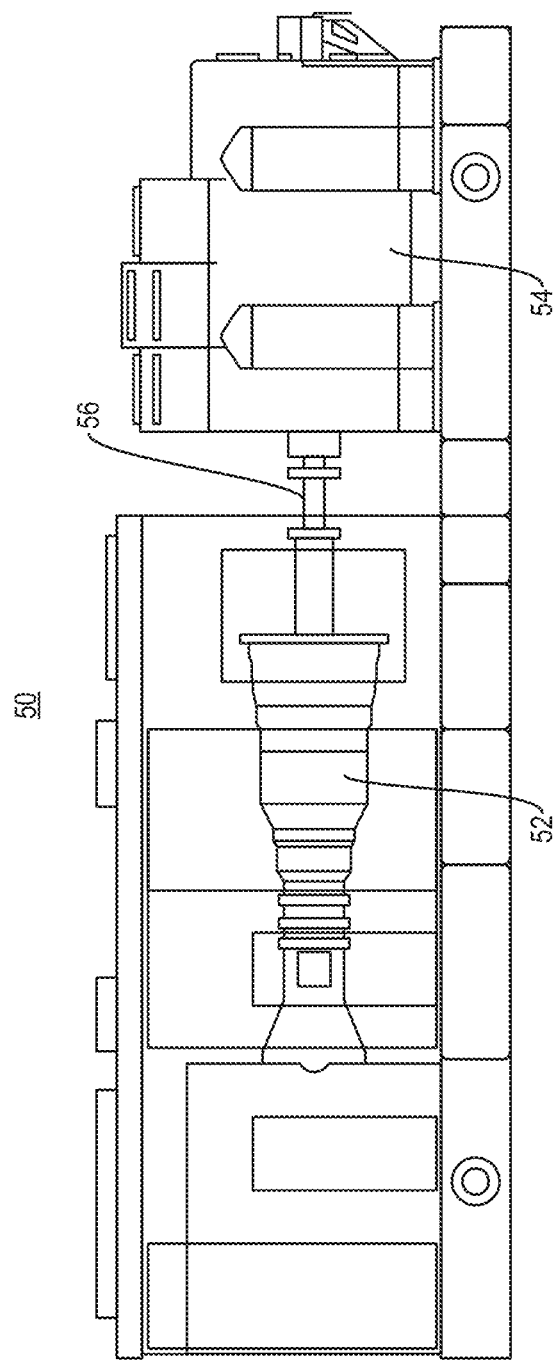
FIG. 2 shows a partial cut-away, side elevational view of a turbo-generator used with a multi-function power system according to an aspect of this disclosure.

Referring to FIG. 8A, in the ship described in this example, there are two main engine rooms, ER1 402 and ER2 404. In ER1 402 there is included turbo-generator 406 connected to three phase switchgear 408 via cable 407. Also in ER1 402 is turbo-generator 410 connected to three phase switchgear 412. The turbo-generators may be 29 MW 3600 rpm 2 pole generators as shown in FIG. 2 and may include a high inertia HTS generator, as described above with regard to FIGS. 4-6. FIG. 8A depicts the standard configuration for the MF-IPS system described herein. In FIGS. 8B and 8C two alternative operating configurations are depicted.

First, ER1 402 will be described. In this configuration, turbo-generator 406 is connected to and powers electric propulsion motor 414, which in this case may be a 37 MW HTS motor, via disconnect switch 420 which is fed by switchgear 408 interconnected to cable 409. Turbo-generator 406 is operated in a variable frequency/voltage mode with the speed of the motors/ship varied by adjusting the frequency and hence rotation of the turbo-generator and in turn the HTS motors. Electric propulsion motor 414 is connected to the starboard shaft (not shown) to drive starboard propeller 416. Starboard propeller 416 uses controllable pitch controller 418 to operate as a controllable pitch propeller to provide finer control over the ship's movement when needed for maneuvering and docking, for example.

Switchgear 408 is also connected to switchgear 422 by cross-connect cable 423 in order to power switchgear 422, as needed. Switchgear 408 is also connected to ER2 404 via cross-connect cable 425 in the event that supplemental power from ER1 402 is needed by ER2 404 and vice-versa. Switchgear 422 is normally connected to and powered by turbo-generator 410 via switchgear 412. In alternate configurations, switchgear 422 may be used to power electric propulsion motor 414, via cable 427 (with the turbo-generator 410 operating in a variable frequency/variable voltage mode), or it may be used to provide supplemental power to ER2 404 via cross-connect cable 429. In the current configuration depicted, turbo-generator 410 is connected through switchgear 412 to electric weapons switchgear units 430a and 430b via cables 432a and 432b, respectively. Electric weapons switch gear units 430a and 430b are connected to electric weapons 434a and 434b, respectively. Turbo-generator 410 is operated in a fixed voltage/fixed frequency mode (e.g. 4160 VAC and 60 Hz).

Operation of the various components in ER1 402 are under the control of ER1 machine controller 440 which is in communication with a master controller (not shown) which receives control signals from the ship's bridge. Through the master controller and the ER1 machine controller 440 and ER2 machine controller (discussed below), various functional configurations of the multi-functional integrated power system 400 may be implemented as described with regard to FIGS. 8A-C.

In ER2 404 there is included turbo-generator 440 connected to three phase switchgear 442 and turbo-generator 444 connected to three phase switchgear 446. These turbo-generators may also be configured as shown in FIG. 2 and may include a high inertia HTS generator as described above with regard to FIGS. 4-6. In this configuration, electric propulsion motor 448, which in this case is a 37 MW W HTS motor, is powered by turbo-generator 440. Turbo-generator 440 is connected to and powers electric propulsion motor 448, via disconnect switch 443 which is fed by switchgear 442 interconnected to cable 445. Turbo-generator 440 is operated in a variable frequency/voltage mode, as described above.

HTS motor 448 is connected to port shaft which drives port propeller 450. Port propeller 450 uses controllable pitch controller 452 to operate as a controllable pitch propeller to provide finer control over the ship's movement when needed for maneuvering and docking, for example.

Turbo-generator 444 connected to three phase switchgear 446 is, in this configuration, primarily used to power electric weapons switchgear units 430a and 430b (in conjunction with or alternative to turbo-generator 410, as described above) via cables 447a and 447b, respectively. Turbo-generator 444 is operated in a fixed voltage/fixed frequency mode (e.g. 4160 VAC and 60 Hz). Electric weapons switch gear units 430a and 430b are connected to electric weapons 434a and 434b, respectively. Switchgear 446 is also connected to switchgear 442 by cross-connect cable 455 in order to back-feed switchgear 442, as needed. Switchgear 456 is connected to switchgear 446 and additionally it is connected to switchgear 408 in ER1 402 via cross-connect cable 425 in the event that supplemental power from ER2 404 is needed by ER1 402 and vice-versa. Switchgear 456 is also connected to electric propulsion motor 448, via disconnect switch 443 which is fed by cable 457. In an alternate configuration, turbo-generator 444 may be used to power electric propulsion motor 448 by changing its mode of operation to variable frequency/voltage mode.

Operation of the various components in ER2 404 are under the control of ER2 machine controller 462 which is in communication with a master controller (not shown) which receives control signals from the ship's bridge. Through the master controller, the ER1 machine controller 440 and ER2 machine controller 462, various functional configurations of the multi-functional integrated power system 400 may be implemented.

In addition to the four primary turbo-generators 406, 410, 440, and 444, there may be included one or more small turbo-generators (on a naval ship referred to as ship service gas turbine generators or "SSGTGs"), each outputting approximately 3.9 MW, such as SSTG's 470 and 472 located, respectively, in auxiliary machinery room (AMR 1) 480 and generator room 490. These SSGTG's may provide power to ship service network. SSGTG No. 1 470 may be connected to ship service transformer A 471 via ship service switchgear 473. Similarly, SSGTG No. 2 472 may be directly connected to ship service transformer B 475 via ship service switchgear 477.

Ship service switchgear 473 may also be interconnected to ship service switchgear 477 in generator room 490 via cable 482. It may also be connected to a third ship service switchgear 492 in ER 2 404 via cable 484 and switchgear 408 via cable 486. Cable 487 may connect ship service switchgear 472 to sensor system. Ship service switchgear 477 may also be interconnected to service switchgear 492 in ER 2 404 via cable 494 and to switchgear 442 in ER 2 404 via cable 496. Switchgear 447 may further be connected to the sensor system via cable 498.

With respect to FIG. 8A, a standard mode of operation of the MF-IPS 400 are described above. In the standard mode of operation turbo-generators 406 and 440 are operated in a variable frequency/variable voltage mode operation in order to drive electric propulsion motors 414 and 448, respectively. The weapons systems 434a and 434b are powered by either turbo-generator 410 or turbo-generator 444 individually or in combination, with both turbo-generators operating in a fixed frequency/fixed voltage mode.

A second mode of operation is depicted in FIG. 8B, which enables fuel efficient transit at slower speeds (e.g. 20 knots) without the electric weapons systems energized. In this configuration, turbo-generator 440 in ER 2 404 is on-line and is powering both HTS motors 414 and 448 in a variable frequency mode. Turbo-generators 406, 410, and 444 are off-line. SSTG's 470 and 472 are online and are energizing to ship service transformer A 471 and ship service transformer B 475 to supply all of the power to the ship service network.

In a third mode of operation (full combat) depicted in FIG. 8C, turbo-generator 406, 440, and 444 are online and operating in a variable frequency/variable voltage mode to power HTS motors 414 and 448 which allows the ship to travel at 32 knots. Turbo-generator 410 is online and operating in a fixed frequency/fixed voltage mode to power electric weapons systems 434a and 434b. In addition, both SSTG's 470 and 472 are online and are energizing to ship service transformer A 471 and ship service transformer B 475 to supply all of the power to the ship service network.

The three functional configurations of the MF-IPS 400 depicted in FIGS. 8A-8C are only exemplary configurations and other configurations are possible and are encompassed within the scope of the disclosure. The multi-functional integrated power system of the disclosure, uses multiple separate buses And, depending on load type the turbo-generators are uniquely operated in either a fixed frequency/fixed voltage mode or a variable frequency/variable voltage mode. This minimizes the complication, risk and attendant significant volume of power electronics and computing power required to maintain stability and near type 1 quality power required for single bus operation. It eliminates the large and complex power electronics motor drive typically needed for electric propulsion motors and it utilizes high inertia HTS generators to directly connect to the electric weapons, rather than connecting through large and expensive intermediary energy storage devices and filter.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

We claim:

1. An electrical power system for a watercraft, comprising:
   a first electrical power plant configured to selectively operate in either a variable frequency mode to output variable frequency power to a first electrical network or a fixed frequency mode to output fixed frequency power to a second electrical network; wherein the first electrical power plant includes a primer mover and a generator;
   a first electrical load including a first high temperature superconductor (HTS) motor connected to the first electrical network to provide propulsion for the watercraft;
   a second electrical load connected to the second electrical network; and
   a controller configured to selectively connect the generator of the first electrical power plant to the first electrical network and to operate the first electrical power plant in the variable frequency mode to output variable frequency power from the generator to power the first HTS motor or to selectively connect the generator of the first electrical power plant to the second electrical network and to operate the first electrical power plant in the fixed frequency mode to output fixed frequency power from the generator to power the second electrical load.

2. The electrical power system of claim 1 wherein the second electrical load includes at least one of an electric weapons system and a ship service system.

3. The electrical power system of claim 2 further including a third electrical network interconnected to a third load which includes at least one of an electric weapons system and a ship service system; and wherein the controller is configured to selectively connect the first electrical power plant to one of the first electrical network, the second electrical network and the third electrical network.

4. The electrical power system of claim 1 wherein the generator of the first electrical power plant includes at least one high inertia HTS generator.

5. The electrical power system of claim 1 wherein the prime mover of the first electrical power plant includes at least one gas turbine, steam turbine, or diesel engine interconnected to the generator.

6. The electrical power system of claim 3 further including a second electrical power plant configured to selectively power the first electrical network, the second electrical network, and the third electrical network; wherein the second electrical power plant includes at least one high inertia HTS generator and at least one gas turbine, steam turbine, or diesel engine prime mover interconnected to the at least one high inertia HTS generator.

7. The electrical power system of claim 6 wherein the controller connects the first electrical power plant to the first electrical network and operates the first electrical power plant in a variable frequency mode and the controller connects the second electrical power plant to one or both of the second and third electrical networks and operates the second electrical power plant in a fixed frequency mode.

8. The electrical power system of claim 7 further including fourth electrical load connected to the first electrical power network and wherein the fourth electrical load includes a second high temperature superconductor (HTS) motor to provide propulsion for the watercraft.

9. The electrical power system of claim 1 wherein the watercraft is one of a ship or a submarine.

10. The system of claim 1 wherein in the variable frequency mode the first electrical power plant outputs power having first electrical characteristics, wherein the first electrical characteristics include the variable frequency and a variable voltage; and
   wherein in the fixed frequency mode the first electrical power plant outputs power having second electrical characteristics, wherein the second electrical characteristics include the fixed frequency and a fixed voltage; and wherein the controller is configured to selectively connect the first electrical power plant to the first electrical network and to operate the first electrical power plant in the variable frequency mode to output the variable frequency power having the first electrical characteristics and provide the variable frequency power having the first electrical characteristics to the first HTS motor and to selectively connect the first electrical power plant to the second electrical network and to operate the first electrical power plant in the fixed frequency mode to output fixed frequency power having the second electrical characteristics and provide the fixed frequency power having the second electrical characteristics to the second electrical load.

* * * * *